Figure 1:
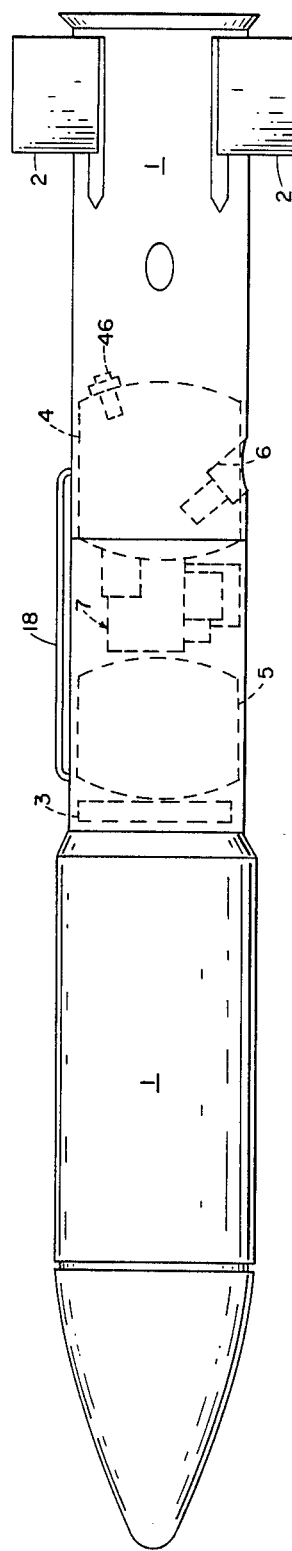

United States Patent [19]

Waddington

[11] Patent Number: 4,762,293
[45] Date of Patent: Aug. 9, 1988

[54] ROCKET PROJECTILES

[75] Inventor: John F. Waddington, Tonbridge, England

[73] Assignee: The Secretary of State for Defence in Her Britannic Majesty's Government of the United Kindgom of Great Britain and Northern Ireland, United Kingdom

[21] Appl. No.: 785,046

[22] Filed: Dec. 12, 1968

[30] Foreign Application Priority Data

Dec. 13, 1967 [GB] United Kingdom ............... 56728/67

[51] Int. Cl.⁴ ........................................... F42B 15/033
[52] U.S. Cl. ................................................. 244/3.22
[58] Field of Search ............................. 244/3.22, 3.23

[56] References Cited

U.S. PATENT DOCUMENTS 2,726,510 12/1955 Goddard ..................... 244/3.22 UX
3,350,886 11/1967 Feraud et al. .................. 244/3.22 X
3,365,147 1/1968 Wolfe .......................... 244/3.22 UX
3,374,967 3/1968 Plumley .......................... 244/3.22 X Primary Examiner—Charles T. Jordan
Attorney, Agent, or Firm—Harold W. Hilton

[57] ABSTRACT

A control system for a guided missile includes means for rotating the missile about its axis, a discharge nozzle so directed that its thrust exerts a lateral force on the missile and an associated reaction motor arranged to deliver, in response to a suitable signal, a thrust of suitable timing and duration to correct the missile trajectory. A suitable reaction motor has a combustion chamber in communication with the discharge nozzle by way of a relief valve, a compressible fuel tank pressurized by gases from the combustion chamber by way of a differential piston pump actuable by the combustion gases and controlled by a command operable, solenoid actuated valve, and means for initially heating and pressurizing the combustion chamber.

11 Claims, 3 Drawing Sheets

ROCKET PROJECTILES

This invention relates to rocket missiles and is particularly concerned with a control system for a command to line of sight, guided missile.

A control system in accordance with the invention comprises, in a guided missile, means for rotating the missile about its axis; a discharge nozzle so directed that the thrust therefrom has a lateral component relative to the missile and a reaction motor associated with said nozzle and arranged to deliver, in response to a suitable signal, a thrust, appropriately timed in relation to the roll position of the missile and of appropriate duration, for correcting the missile trajectory.

The rotation of the missile may be produced by known means such as a torque rocket or a rifled launcher and may be maintained by means of canted fins. Preferably the roll speed is approximately constant. The nozzle is preferably located so that the line of thrust therefrom passes through or near the centre of gravity of the missile so that lateral, bodily movement is imparted to the missile while induced pitching or yawing is reduced to a minimum. This in turn improves the missile's response to acceleration demands and reduces the required beam angle and power of any tracking beacon with which the missile may be provided. The thrust may also have a forward component, parallel to the missile axis to assist in overcoming aerodynamic drag. The required timing and duration of the thrust may be computed, in known manner from the observed position of the missile relative to the required trajectory and a suitable signal may be transmitted to the missile through a radio or trailing wire link by means of a suitable pulse encoder. The techniques for achieving this are known and the specific arrangement required in this case does not form part of the present invention and will not be further described.

The invention further provides a reaction motor for use in the control system, said motor comprising a combustion chamber; a discharge nozzle to which the combustion chamber has access by way of a relief valve; a compressible fuel tank which can be pressurised by gases from the combustion chamber and which communicates with the combustion chamber through an injection system incorporating an injector, a differential piston pump, actuable by pressure of gases from the combustion chamber, for feeding fuel to the injector and a valve operable on command, to control pressure on one side of the differential piston; and means for initially heating and pressurising the combustion chamber.

The relief valve may conveniently comprise a simple, spring closed valve arranged to open, when the gas pressure in the combustion chamber rises above a predetermined value, to allow gas to discharge through the nozzle. The fuel tank may comprise an inner container, made wholly or partly of flexible material such as rubber or a plastics material, which is located within a rigid outer container and can be pressurised by combustion gases admitted into the outer container. Alternatively the inner container may be in the form of a bellows. A third form of tank may consist of a cylinder one end wall of which constitutes a piston to whose outer face the combustion gases have access. In this last form of tank the piston forming its end wall may constitute the differential piston pump though this may, of course, be a separate structure located elsewhere in the injection system. The command operable valve may, conveniently, be solenoid actuated and may control the passage of the combustion gases to the differential piston or may control an exhaust port communicating with the opposite side of the piston. The means for initially pressurising and heating the combustion chamber may comprise an electrically initiated, solid propellant igniter the gases from whose combustion will serve to provide an initial working pressure in the chamber and other parts of the motor and will also be hot enough to ignite fuel entering the chamber via the injector. The initial pressurisation and heating may alternatively be achieved by igniting an initial charge of fuel by means for example of a spark plug.

Figure 5:
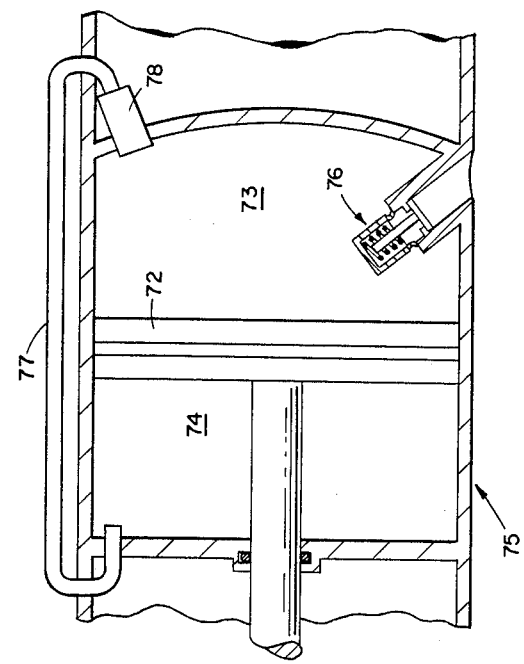
Figure 3:
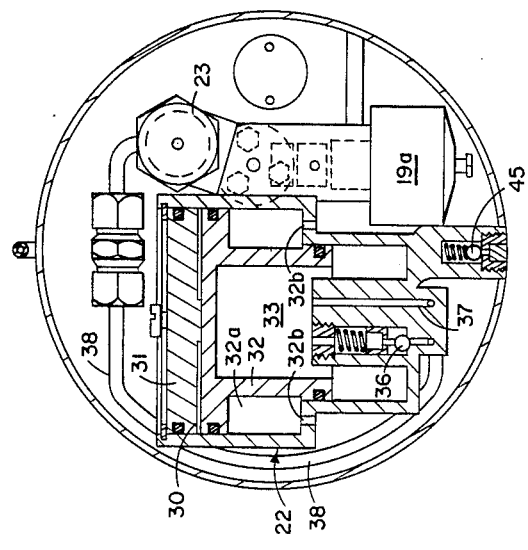
Figure 2:
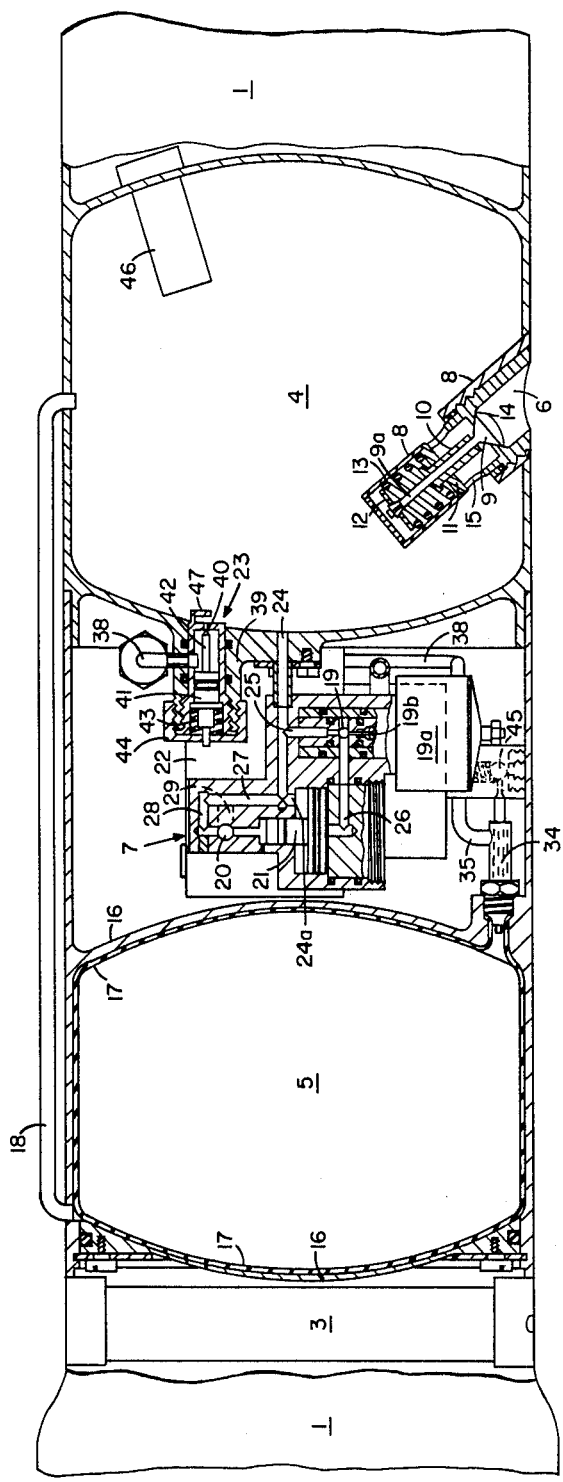
Figure 4:
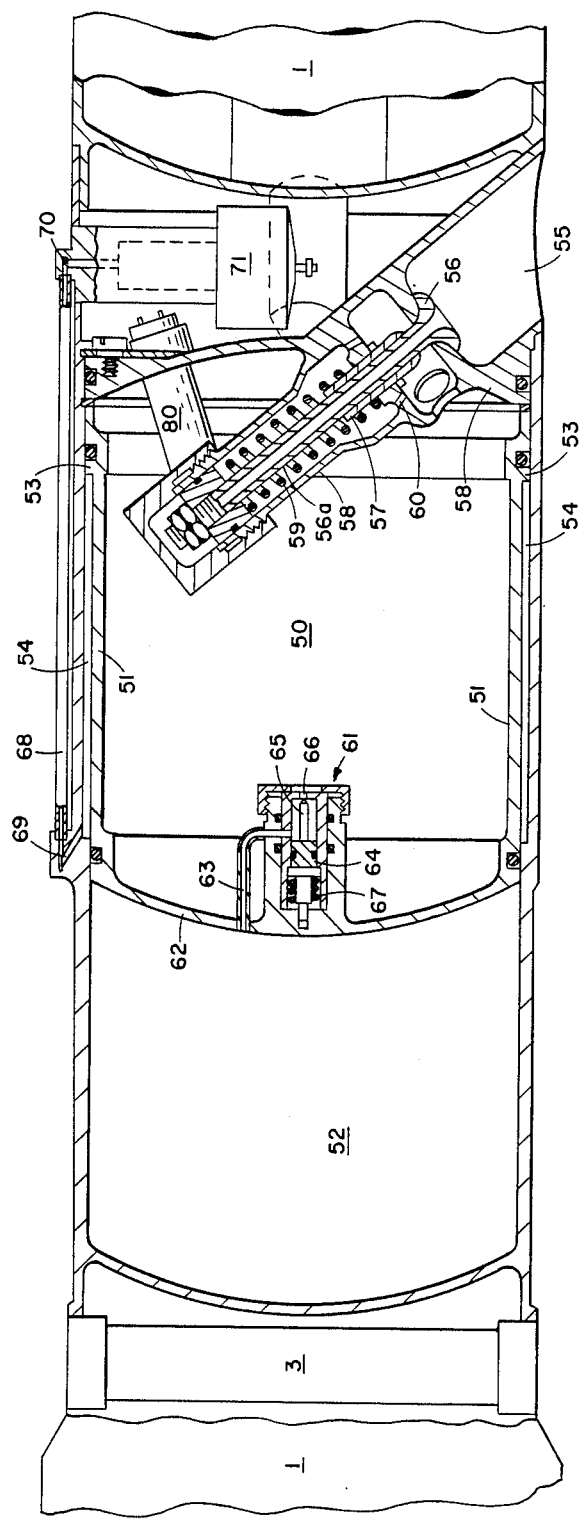

Several forms of the invention will now be more particularly described, by way of example only, with reference to the accompanying drawings in which:

FIG. 1 is a partly diagrammatic, side elevation of a missile incorporating a control system in accordance with the invention, FIG. 2 is an enlarged axial section of a part of the missile showing the control system, FIG. 3 is a cross section on the line III—III of FIG. 2, FIG. 4 is a section similar to FIG. 2 showing an alternative form of control system, and FIG. 5 is a diagrammatic drawing of a modified form of the motor shown in FIG. 4.

The missile shown in FIG. 1 has a body 1 of conventional form having the usual tail fins 2 which may be canted to sustain the roll initially imparted in known manner by a torque rocket 3. Situated amidships in the body 1 is a control motor including a combustion chamber 4, a fuel tank 5, a discharge nozzle 6 and an injection system 7 arranged to inject fuel, on command, into the chamber 4.

The construction and functioning of the control system will be better understood by reference to FIGS. 2 and 3 where they are illustrated on a larger scale in greater detail. The combustion chamber 4 has, mounted internally on its cylindrical wall, a generally cylindrical nozzle housing 8 incorporating a valve 9 whose stem 9a is carried in a valve guide 10 supported by a cross-member 11 fixed in the housing 8. The end of the stem 9a remote from the valve carries a flange 12, and a spring 13 in compression between this flange and the cross member 11 urges the valve inwardly onto an outwardly facing seating 14 at the inner end of the nozzle 6 which is thereby closed. The combustion chamber communicates with the interior of the nozzle housing, inwardly of the valve 9, through orifices 15 so that gas pressure in the combustion chamber tends to open the valve 9.

The fuel tank 5 consists of a rigid outer container 16, whose walls may, though not necessarily, incorporate a part of the missile wall, and a flexible inner container 17 of a material such as rubber or a plastic. The combustion chamber communicates with the interior of the outer container 16, exteriorly of the inner container 17, through a pipe 18 which, as shown, runs longitudinally along the outer surface of the missile.

The injector system 7 comprises a solenoid actuated ball valve 19, a second stage pressure controlled valve 20 actuable by a differential piston 21, a differential piston pump 22 (best illustrated in FIG. 3) and an injector 23 with the necessary connecting tubes and channels. Details of the solenoid 19a, which actuates valve 19, are not shown since this may have any convenient construction and is actuable in known manner in response to a signal transmitted from a ground control station through trailing wires, a radio link or other convenient, known means. The combustion chamber 4 communicates through channels 24, 25 with one side of the solenoid valve 19 which is actuable through a push rod 19b by means of the solenoid 19a. The other side of valve 19 communicates, through a channel 26, with the lower, larger area, side of a piston 21 which controls the second stage valve 20. This valve opens or closes communication between the combustion chamber 4 and the pump 22 by way of channels 24, 27, 28, and pipe 29. The pipe 29 provides access to the interspace 30 between a bulkhead 31 and a differential piston 32 in the reciprocating pump 22 which incorporates, below the piston 32, a fuel chamber 33. An annular space 32a between the smaller cross-sectioned part of the piston 32 is vented to atmosphere through parts 32b. The combustion chamber 4 also communicates, by way of channels 24, 24a directly with the upper, smaller area, side of differential piston 21.

The fuel chamber 33 of the pump 22 receives fuel from the tank 5 by way of a connector 34, a pipe 35 (FIG. 2) and a non return valve 36 (FIG. 3), and is also connected through an outlet 37 and a pipe 38 with the injector 23. The injector 23 comprises a cylindrical casing 39 formed or mounted on the wall of the combustion chamber to which it has access through an injection orifice 40; and an injector piston 41 slidable in the casing 39 and carrying, on the side thereof adjacent the injection orifice 40, a spigot 42 projecting axially therefrom. The spigot 42 has a conical tip which normally closes the injection orifice 40, being so biased by an injector spring 43 in compression between the injector piston 41 and a cap 44 which constitutes the end wall of the casing 39. A splash plate 47 is provided adjacent the injection orifice 40.

Before the missile is fired, the tank 5 and the pump chamber 33 and injector 23 are filled with mono-propellant fuel such as isopropyl nitrate through a filler valve 45. At launch, the combustion chamber 4 is preheated and pressurised by firing an igniter 46 of solid propellant or, alternatively, a priming charge of liquid propellant may be fired by means of a spark plug. The pressure is immediately transmitted from the combustion chamber to the fuel tank by way of tube 18 and also to the upper side (direct) and lower side (through the solenoid valve 19 which is open at this stage) of the differential piston 21 which is thus moved upward, closing the second stage valve 20. The pressure applied at this stage (the working pressure) is insufficient to overcome the springs 13, 43 closing the relief valve 9 and injector 23 respectively. Roll is imparted to the missile by firing the torque rocket 3 and is maintained in flight by the canted fins 2. On receipt of the appropriate signal, the solenoid valve 19 is closed by operation of the solenoid 19a, cutting off the gas supply to the lower side of piston 21 and, at the same time venting the lower side to atmosphere through the solenoid valve, thus allowing the piston 21 to move to its lower position (as shown in FIG. 2) under the influence of the gas pressure applied to its upper surface. This movement allows the second stage valve 20 to open, admitting gas to the interspace 30 above the pump piston 32. The gas pressure on the pump piston 32 applies an intensified pressure, through this differential piston, to the fuel in chamber 33 some of which fuel is forced through the outlet 37 causing fuel to be injected into the combustion chamber 4 through the injector 23 since the intensified pressure is sufficent to overcome the injector spring 43.

The injected fuel ignites in the hot combustion chamber and the increased pressure thus developed opens relief valve 9 whereupon gas is discharged from the nozzle 6 to provide a trajector-correcting thrust. After the required duration, the solenoid valve 19 again opens allowing gas pressure to close the second stage valve 20 whereupon the interspace 30 of the pump is vented to atmosphere through valve 20 and orifice 48 allowing the pump piston 32 to rise again, the chamber 33 being refilled with fuel from the tank through non return valve 36. The pump 22 must clearly be of sufficient capacity to cater for the greatest thrust duration which is likely to be required.

The alternative form of motor shown in FIG. 4 is somewhat simpler in construction and has a combustion chamber 50 located on one side of a large, cup shaped, differential piston 51 on the other side of whose base is a fuel tank 52. The piston 51 slides in a cylinder having a stepped bore the smaller part of which constitutes the fuel tank 52 and accommodates the smaller, base end of the wall of the tank. The larger portion of the bore accommodates an enlarged portion 53 of the differential piston and encloses an annular chamber 54 between its inner surface and the outer wall of the piston 51 for most of the length of the latter. A nozzle 55, closed by a relief valve 56 whose stem 56a is carried in a guide 57 within a nozzle housing 58 and which is biased closed by a spring 59, is mounted in one wall of the combustion chamber 50 which has access to the inner side of the valve 56 through orifices 60. This nozzle and valve are basically similar in construction and is operation to those descibed with reference to FIG. 2. In this alternative motor, an injector 61 basically similar in construction to that shown in FIG. 2 is mounted on the end wall 62 of the piston 51 and communicates with the fuel tank through pipe 63. The injector has a piston 64 carrying a spigot 65 which normally closes an injection orifice 66 under the action of a spring 67.

The annular space 54 is vented to a pipe 68 through orifice 69 and the pipe 68 is vented to atmosphere through a valve 70 normally closed by solenoid 71.

In operation the missile has roll imparted in the manner previously described which roll is maintained by canted fins. The combustion chamber 50 is preheated and pressurised at launch by means of an igniter 80, prior to which the fuel tank 52 and injector 61 will have been filled with fuel and the interspace 54 filled with a suitable pressure fluid. Gas pressure in the combustion chamber 50 is, at this stage, insufficient to overcome the spring closure of the relief valve 56 and movement of the piston 51 is prevented by the pressure of the fluid in the annular space 54. On receipt of a suitable signal, the solenoid valve 70 is opened allowing the fluid from annular space 54 to bleed to atmosphere. The piston 51 now moves toward the fuel tank 52 and fuel is injected into the combustion chamber 50 where the increased pressure resulting from its combustion overcomes the spring 59 of the relief valve 56 which opens allowing gas to discharge through nozzle 55. At the end of the required duration the solenoid valve 70 closes, movement of the piston 51 ceases and fuel ceases to be injected into the combustion chamber 50. Subsequent operation of the solenoid valve 70 will cause the piston 51 to continue its movement, the piston stroke merely being interrupted during closure of the valve.

The further modification, shown diagrammatically in FIG. 5, dispenses with the annular space 54 and pressure fluid of the arrangement of FIG. 4, the solenoid valve being incorporated with the injector in a communication link between the fuel tank and combustion chamber. In this modified arrangement, a quite differently shaped, differential piston 72 constitutes the dividing wall between a combustion chamber 73 and a fuel tank 74 which constitute parts of a cylinder 75. The combustion chamber 73 is provided, as before, with a combination nozzle and relief valve 76 and the tank 74 and combustion chamber 73 are in communication by way of a pipe 77, through a solenoid valve and igniter which may be incorporated in a single unit 78 mounted in the wall of the combustion chamber 73. Structural details of the various items are not shown in this case, they may be similar to those already described.

It will be clear that many variations may be made in the above described systems within the scope of the present invention. The injector, for example may be replaced by a vortex type nozzle, the relief valve may be of any convenient construction as may also the solenoid valve and other items of the injection system. Spin may be imported by means of a rifled launcher instead of by a torque rocket and may be sustained by means of canted nozzles on the main driving motor.

I claim:

1. A control system for a guided missile comprising means for rotating the missile about its axis; a discharge nozzle so directed that the thrust therefrom has a lateral component relative to the missile; a reaction motor associated with the said nozzle and having means for actuating the said motor, in response to a suitable signal, to produce a thrust from the nozzle appropriately times in relation to the roll position of the missile and appropriate duration for correcting the missile trajectory; said reaction motor comprising a combustion chamber; a discharge nozzle associated with said combustion chamber; a relief valve through which said combustion chamber has access to said discharge nozzle; a compressible fuel tank; means for pressurizing the fuel tank; an injection system by way of which said fuel tank communicates with said combustion chamber and incorporating an injection nozzle; a differential piston pump, incorporating a piston having larger area and smaller area sides and actuable by pressure of gases from said combustion chamber, for feeding fuel to the injection nozzle; a command operable valve for controlling the differential piston pump; and means for initially heating and pressurizing said combustion chamber.

2. A control system as claimed in claim 1 wherein the line of action of the thrust from the nozzle passes substantially through the centre of gravity of the missile.

3. A control system as claimed in claim 1, where the nozzle is directed outwardly and rearwardly of the missile to provide a thrust having both lateral and forward components.

4. A reaction motor as claimed in claim 1, wherein the relief valve incorporates a spring urging the valve toward its closed position whereby the valve opens against the action of the spring when the pressure in the combustion chamber rises above a predetermined value.

5. A reaction motor as claimed in claim 1, wherein the fuel tank comprises an inner container made at least partly of flexible material and a rigid outer container surrounding the said inner container and to which gases from the combustion chamber have access to compress said inner container.

6. A reaction motor as claimed in claim 1, wherein the fuel tank comprises a container and a piston constituting one end wall of said container and to whose outer face the gases from the combustion chamber have access to compress the fuel tank.

7. A reaction motor as claimed in claim 6, wherein the container and the piston which constitutes one end wall thereof constitute the differential piston pump.

8. A reaction motor as claimed in claim 1, wherein the command operable valve incorporates solenoid, actuating means.

9. A reaction motor as claimed in claim 1, wherein the command operable valve controls the passage of the gases from the combustion chamber to the differential piston pump.

10. A reaction motor as claimed in claim 1, wherein the differential piston pump incorporates an exhaust port on the smaller area side of the differential piston, which exhaust port is controlled by the command operable valve.

11. A reaction motor as claimed in claim 1 wherein the means for initially heating and pressurising the combustion chamber comprises an electrically firable solid propellant igniter.

* * * * *